Patented Oct. 24, 1950

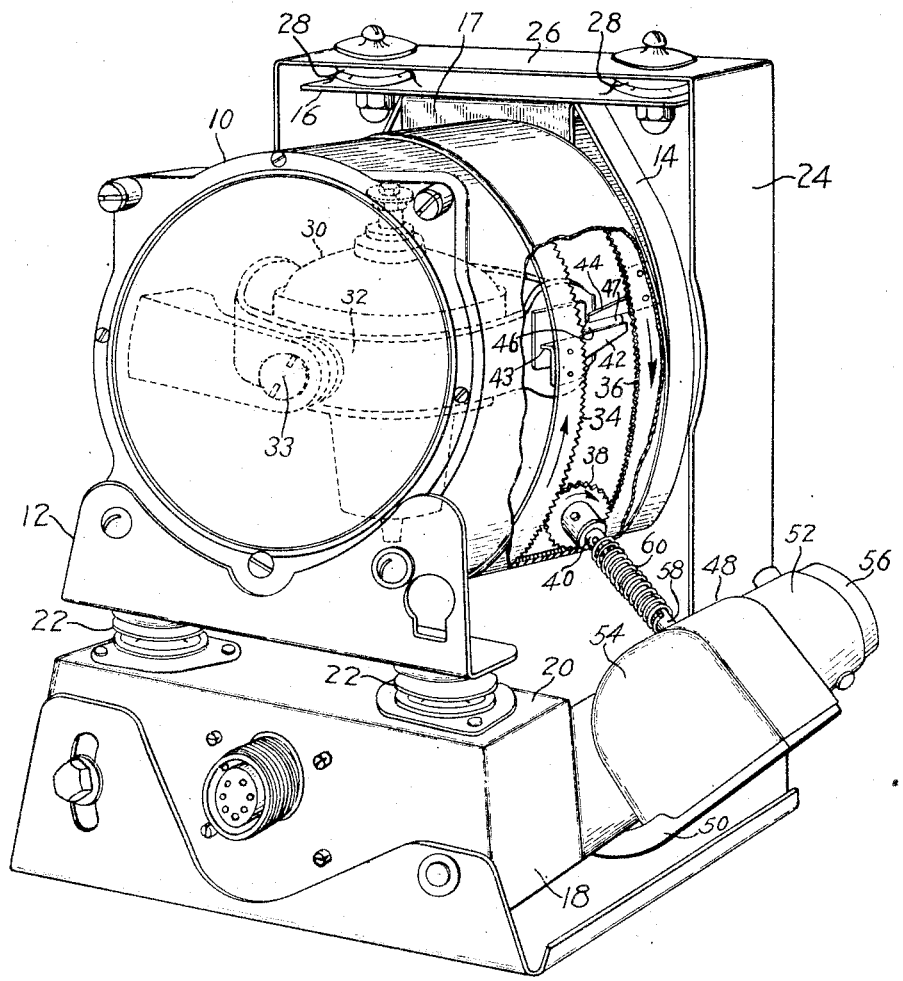

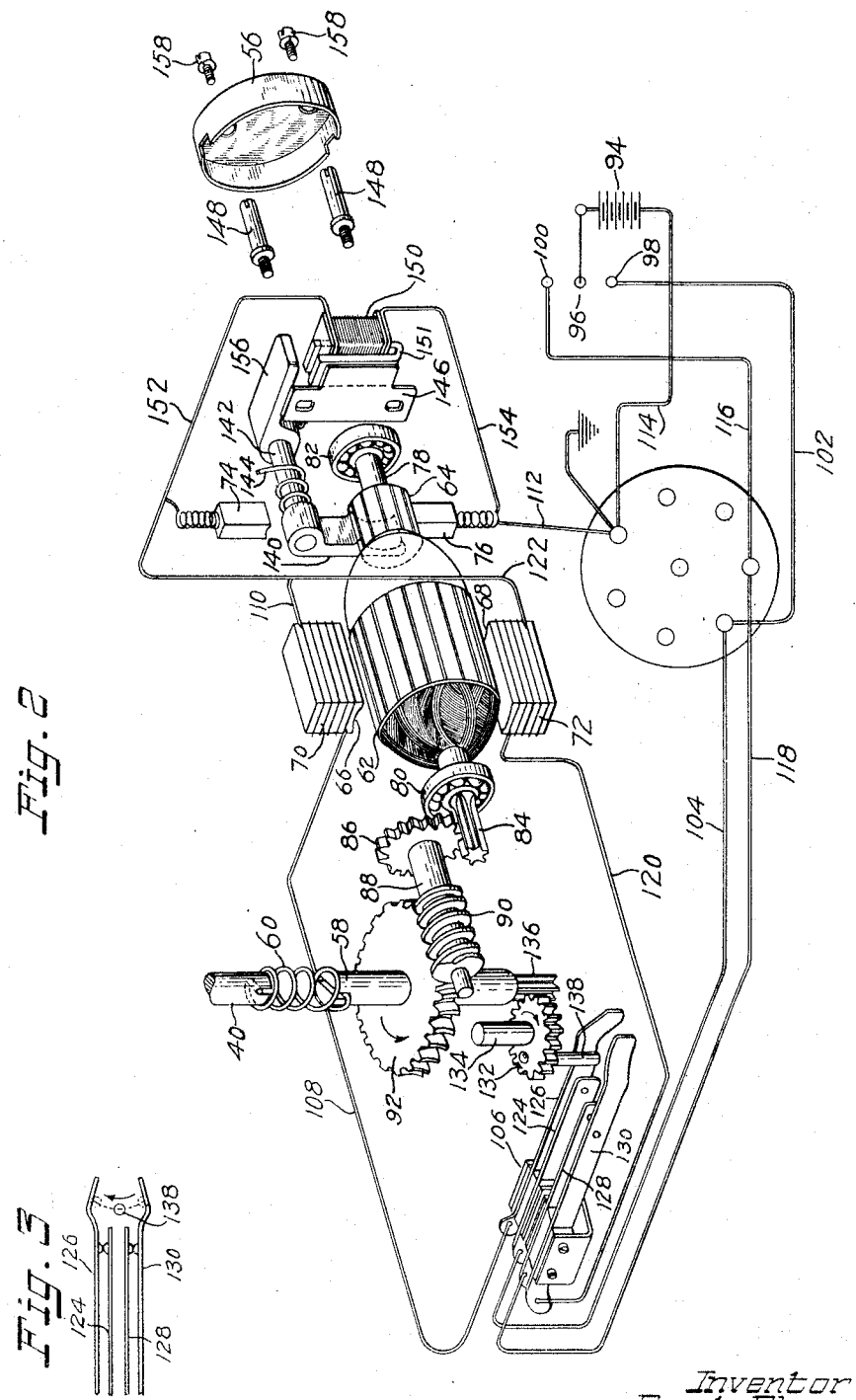

2,527,055

UNITED STATES PATENT OFFICE 2,527,055

GYROSCOPE CAGING AND UNCAGING DEVICE

Evert Blomgren, Berlin, Conn., assignor to Raymond Engineering Laboratory, Inc., Berlin, Conn., a corporation of Connecticut Application July 24, 1946, Serial No. 685,932

10 Claims. (Cl. 74—5.1)

An airplane gyroscope of the type to which this invention relates is ordinarily used only during normal flight of the airplane and not during maneuvers or other operations when the attitude of the airplane may be suddenly and rapidly changed. In order to prevent violent and harmful oscillation and banging of the gimbal rings of the gyroscope as the result of sudden changes in attitude, the gyroscope is usually provided with mechanism for caging and uncaging. When caging is effected the gimbal rings are moved to the relative position which they occupy during level flight and are locked in such positions. When uncaging is effected the gimbal rings are released and the gyroscope is again free for normal operation. Caging and uncaging are ordinarily effected manually by means of a knob carried by a rotatable caging shaft projecting from the casing of the gyroscope.

Manual caging and uncaging is inconvenient or impossible under some conditions of gyroscope installation and use, and the general object of the present invention is to provide a satisfactory electrically operated device adapted to be connected with the gyroscope to effect caging and uncaging automatically upon the closing of a conveniently located control switch.

A more specific object of the invention is to provide a resilient connection between the caging shaft of the gyroscope and an operating shaft of the caging and uncaging device, this resilient connection cushioning the shock incident to caging and permitting minor relative movements between the gyroscope and the device and having other advantages.

A further specific object of the invention is to provide an electrical control system for the caging and uncaging device which serves to automatically open the circuit of the motor thereof upon the completion of caging and also to automatically open the circuit of the said motor when the caging shaft of the gyroscope has been rotated to a predetermined extent in the uncaging direction.

A further object of the invention is to provide means enabling the caging and uncaging device to effect operation of the caging mechanism of the gyroscope relatively slowly in the caging direction and relatively rapidly in the uncaging direction.

A still further object of the invention is to provide in an electrically operated caging and uncaging device a retarding means, such as a brake, which acts automatically to quickly stop the motor of the device when the operating circuit thereof is opened.

Other objects of the invention will be apparent from the following specification and claims.

In the drawings I have shown in detail a preferred embodiment of the invention, but it will be understood that various changes may be made from the construction shown, and that the drawings are not to be construed as defining or limiting the scope of the invention, the claims forming a part of this specification being relied upon for that purpose.

Of the drawings,

Fig. 1 is a perspective view showing a gyroscope and showing a caging and uncaging device embodying the invention.

Fig. 2 is a schematic view showing the essential parts of the caging and uncaging device.

Fig. 3 is a detail view showing a portion of the limit switch.

Referring particularly to Fig. 1, the gyroscope is indicated in its entirety by 10. The gyroscope is supported at its front end by means of a vertical plate 12 having a horizontal flange at the bottom thereof. The gyroscope is supported at its rear end by means of a clamping band 14, the upper portion of which is secured to a horizontal plate 16. The lower ends of the band 14 are connected with each other by a clamping bolt, not shown. Depending from the plate 16 is a flange 17 which engages the housing of the gyroscope to prevent relative upward movement. A main supporting frame 18 is provided having a horizontal ledge 20 at the front below the horizontal flange of the plate 12. Interposed between the ledge 20 and the said horizontal flange are two resilient shock mounting elements 22, 22. The frame 18 is provided at its rear with an upright portion 24 having a horizontal plate 26 above the plate 16. Shock mounting elements 28, 28 similar to the elements 22, 22 are interposed between the plates 26 and 16. The four shock mounting elements 22, 22 and 28, 28 serve to resiliently support the gyroscope and to minimize the transmission of external shock thereto.

It will be observed that the front mounting elements 22, 22 are beneath the front portion of the gyroscope and that the rear mounting elements 28, 28 are above the rear portion of the gyroscope. This effects a considerable conservation of horizontal space. The several supporting elements are so located that a plane passing through their respective supporting points also passes through the center of gravity of the gyroscope. This relationship between the supporting points and the center of gravity is important, as it eliminates, or at least minimizes, any tendency for the gyroscope to rock or tilt with respect to the supporting frame 18 when the attitude of the airplane is suddenly changed.

The rotor of the gyroscope is contained within an inner gimbal ring or housing 30, the axis of the rotor in this particular gyroscope being normally vertical during level flight. The inner gimbal ring 30 is carried by an outer gimbal ring 32, being connected thereto for rotation about a transverse axis which is normally level during level flight. The outer gimbal ring 32 is connected with the housing of the gyroscope for pivotal movement about a normally level axis at 33 extending longitudinally of the housing.

Caging is effected by locking the gimbal rings 30 and 32 in their normal horizontal relationship to the housing. Two caging rings 34 and 36 are provided, these rings being positioned within the housing immediately adjacent the periphery thereof and being rotatable about their own axes. The adjacent edges of the rings are provided with gear teeth which mesh with gear teeth on a pinion 38 carried by a caging shaft 40 which projects outward from the gyroscope housing. The rings 34 and 36 are provided respectively with dogs 42 and 44 which project oppositely into the zone between the two rings. The dogs 42 and 44 have inward extending flanges, one of which is shown at 43. A caging stud 46 is rigidly connected with the inner gimbal ring 30 and it projects outward to the exterior of the outer gimbal ring 32, this stud extending through a hole at the pivotal axis about which the gimbal ring 30 moves with respect to the outer gimbal ring 32. The outward projecting end portion of the stud 46 has a laterally extending portion 47 which is positioned to be engaged by the flanges 43 on two dogs 42 and 44 as shown in Fig. 1.

During normal operation of the gyroscope the rings 34 and 36 are so positioned that the dogs 42 and 44 are widely spaced apart, the gimbal rings and the stud 46 being thus entirely free to move. However, when caging is to be effected, the caging shaft 40 and the pinion 38 are rotated so as to turn the rings 34 and 36 in the directions indicated by arrows in Fig. 1, and the movements of the rings are continued until the flanges 43 on the two dogs 42 and 44 engage the stud 46 to move it to the position shown in Fig. 1. The engagement of the flanges 43 on the dogs 42 and 44 with the stud 46 and its extension 47 serves to turn the stud about its axis, if necessary, so as to bring the inner gimbal ring into level position, and also serves to move the stud 46 bodily so as to bring the outer gimbal ring 32 into level position. Thus when the dogs 42 and 44 reach the position shown in Fig. 1 the two gimbal rings have been moved to their level positions, and they are locked in such positions by the dogs. When uncaging is to be effected, the caging shaft 40 and the pinion 38 are rotated in the opposite direction so as to turn the rings 34 and 36 in the directions opposite to the arrows in Fig. 1, the dogs 42 and 44 being thus separated. When the dogs are separated the stud 46 is released and the gimbal rings are free to move.

The caging and uncaging device is indicated in its entirety at 48 and it is shown as being held in fixed position with respect to the frame 18 by means of a supporting bracket 50. The caging and uncaging device 48 has an electric motor 52 to be described, a housing 54 which encloses the bearings and other parts to be described and which carries the motor 52, and an end cap 56 which encloses a portion of the brake mechanism to be described.

The device 48 has an operating shaft 58 which is carried by the housing 54 and is normally in alignment with the caging shaft 40 of the gyroscope and the two shafts 58 and 40 are adapted to be connected by means of a suitable connection 60 which serves to transmit power from one shaft to the other.

When an airplane is not in level flight the caging of a running gyroscope should be effected carefully in order to prevent damage to the bearings and other delicate parts. It is well known that when a force is applied tending to change the axis of rotation, precession occurs in a plane 90° to that of the applied force. When the airplane is not level the practical result of the application of force necessary to effect caging is to cause a violent oscillation or banging of the gyroscope mechanism. In manual caging the fingers of the operator act as a cushion against shocks and it is possible for the operator to ease the gyroscope into locked or caged position. Such manual control of the caging is obviously impossible with a power operated caging mechanism and it is therefore necessary or at least highly desirable to provide an interposed resilient connection which will serve to cushion the shocks. To this end the mechanical connection 60 is preferably resilient.

The provision of a resilient connection at 60 serves not only to cushion the shocks as already stated, but it also serves to permit relative minor movements of the gyroscope as permitted by the shock mounting elements 22, 22 and 28, 28. While the invention is not necessarily so limited, the resilient mechanical connection 60 is preferably a coil spring adapted to be positioned coaxially with the two shafts. As shown more clearly in Fig. 2, the spring 60 has inturned diametrally extending end portions which are adapted to enter diametral slots in the ends of the two shafts. For convenience of illustration Fig. 2 shows the coils of the spring more widely spaced than is ordinarily preferred.

Referring more particularly to Fig. 2, it will be seen that the device includes an electric motor comprising a rotor 62 with a commutator 64. The motor also has pole pieces 66 and 68 with field windings 70 and 72 thereon. The motor also has contact brushes 74 and 76 engaging the commutator 64. The brush 74 is shown separated from the commutator for convenience of illustration. The shaft 78 of the rotor is carried by ball bearings 80 and 82 suitably mounted in the motor housing 52.

As has already been explained, the operating shaft 58 must be rotated in opposite directions to effect caging and uncaging and suitable means are provided for enabling the motor to so rotate the shaft. While the invention is not necessarily so limited, rotation of the shaft 58 in opposite directions is preferably effected by rotating the motor in opposite directions. A suitable power transmitting mechanism is interposed between the motor and the shaft 58 and as shown, this mechanism comprises a pinion 84 which may be formed integrally on the motor shaft 78. The pinion 84 meshes with a gear 86 on a shaft 88 suitably supported in the housing 54. Mounted on or formed integrally with the shaft 88 is a worm 90 which meshes with a worm wheel 92 carried by the shaft 58. The power transmitting mechanism that has been described serves to transmit power from the motor to the shaft 58 and thence through the resilient coupling 60 to the caging shaft 40 of the gyroscope. By reversing the direction of rotation of the motor in the manner to be presently described the operating shaft 58 and the caging shaft 40 can be operated in one direction or the other to effect caging or uncaging.

A suitable source of current is provided, as indicated at 94, and there is also provided a manually operable switch 96 having a neutral open position and having two contacts 98 and 100, the first of which is adapted to be engaged to effect caging and the second of which is adapted to be engaged to effect uncaging.

When caging is to be effected the contact 98 is engaged and the circuit extends from the said contact through the conductors 102 and 104 to a normally closed limit switch 106. From the limit switch the circuit extends through a conductor 108 to the field winding 70 and thence through a conductor 110 to the commutator brush 74. From the brush 74 the circuit extends through the commutator and through the rotor to the commutator brush 76 and thence through conductors 112 and 114 back to the current source 94. When circuit connections are established, as described, the motor is operated in the proper direction to rotate the operating shaft 58 in the direction to effect caging.

When uncaging is to be effected the contact 100 is engaged and the circuit extends from the said contact through the conductors 116 and 118 to the said normally closed limit switch 106. From the limit switch the circuit extends through a conductor 120 to the field winding 72 and thence through a conductor 122 to the commutator brush 74. From the brush 74 the circuit extends as before through the commutator and through the rotor to the commutator brush 76 and thence through the conductors 112 and 114 back to the current source 94. When circuit connections are established, as described, the motor is operated in the opposite direction to rotate the operating shaft 58 in the direction to effect uncaging.

It will be observed that the field windings 70 and 72 are used alternatively and not simultaneously. The said windings are so arranged that one of them serves to effect rotation of the motor in one direction and the other of them serves to effect rotation of the motor in the opposite direction.

The limit switch 106 which has been referred to comprises two conducting metallic strips 124 and 126 to which the aforesaid conductors 104 and 108 are respectively connected. As shown more clearly in Fig. 3, the strips 124 and 126 carry contact points which normally engage each other to establish an electrical connection. The limit switch also comprises two metallic strips 128 and 130 to which the aforesaid conductors 118 and 120 are respectively connected. As shown more clearly in Fig. 3, the strips 128 and 130 carry contact points which normally engage each other to establish an electrical connection.

Means is provided for automatically operating the limit switch to open the circuit of the motor after the operating shaft 58 and the caging shaft 40 have been rotated in the caging direction to effect complete caging and for automatically operating the limit switch to open the circuit of the motor after the said operating shaft 58 and the said caging shaft 40 have been rotated to a predetermined extent in the uncaging direction. As shown, the said means for automatically operating the limit switch comprises a gear 132 carried by a shaft 134 suitably supported in the housing 54. The gear 132 meshes with a pinion 136 at the end of the operating shaft 58, and it carries an eccentrically positioned pin 138 made of nonconducting material which is located between the two outer strips 126 and 130 of the limit switch. The pin 138 is shown in an intermediate position in Fig. 3 and it may be assumed that the pin is moving in the clockwise direction which corresponds to the rotation of the operating shaft 58 in the counterclockwise or caging direction as viewed in Fig. 2. Continued movement of the pin 138 in the clockwise direction brings it into engagement with the strip 126 of the limit switch, thus flexing the strip sufficiently to separate the contact point thereof from its mating contact point on the strip 124. This breaks the electrical connection between the conductors 104 and 108 and opens the circuit of the motor. The relationship of the pin 138 to the operating shaft 58 is such that the circuit is opened after the caging of the gyroscope has been completed. The term "after" is intended to be used in a broad sense and it may include the opening of the motor circuit immediately upon completion of caging or following a limited amount of additional rotation of the shaft 58 to wind up or load the resilient connection such as the coil spring 60.

It will be observed that the power transmitting mechanism that has been described includes the worm 90 and the worm wheel 92, and the said mechanism is therefore self-locking and cannot be operated by rotative force applied to the operating shaft 58. It will be apparent that when caging has been completed the self-locking power transmitting mechanism tends to hold the gyroscope parts in their caged positions. However, even though the gyroscope is caged, it still resists any force tending to change the axis of rotation of its rotor, and the result is that pitching and rolling of the airplane introduce forces due to precession which tend to unlock the caging mechanism. Such forces tend to twist or unwind the spring 60 in the uncaging direction. In order to resist such twisting or unwinding tendency it is preferred to rotate the operating shaft 58 to a limited extent in addition to that necessary to effect actual caging, so as to additionally wind or load the spring to such an extent that it has sufficient torque to resist the said unwinding or uncaging tendency. The extent of winding or loading of the spring 60 is carefully determined to insure sufficient holding power, without however winding it to such an extent as to exceed its elastic limit and cause permanent distortion.

Referring again to Fig. 3, it will be seen that when the motor is subsequently rotated in the uncaging direction the pin 138 is moved in the counterclockwise direction, being disengaged from the strip 126 and being thereafter engaged with the strip 130 to separate the contact point thereon with its mating contact point on the strip 128. This breaks the connection between the conductors 118 and 120 and opens the circuit of the motor. With the motor operating in the uncaging direction the circuit thereof is opened after the caging shaft has been rotated to a predetermined extent. The rotation of the motor in the uncaging direction is sufficient to separate the dogs 42 and 44 of the gyroscope to such an extent that the stud 46 and the gimbal rings can move to any required extent, but the rotation of the motor is insufficient to bring the dogs 42 and 44 into contact at the opposite side of the gyroscope.

It has been found by experiment that it is desirable to effect the caging of a gyroscope relatively slowly as this tends to minimze the amount of vibration or banging of the parts which cannot in any event be entirely avoided. It is preferable, however, to effect uncaging relatively rapidly so as to quickly remove the caging dogs in order to prevent the caging stud from striking one of the retreating dogs in the event of a sudden change of attitude of the airplane. If the stud strikes one of the dogs precession of the gyroscope would occur and considerable additional time might elapse before the gyroscope is fully erected. Relatively slow caging and relatively fast uncaging are brought about by making provision for rotation of the motor relatively slowly in the caging direction and relatively rapidly in the uncaging direction. This result is preferably attained by providing a different electrical resistance in the winding 70 which is used for caging than that which is provided in the winding 72 which is used for uncaging.

As already described, the limit switch 106 and the operating mechanism therefor serve to open the circuit of the motor either immediately upon completion of caging or after limited additional rotation of the shaft 58 to wind the spring 60. The limit switch and the operating mechanism therefor also serve to open the circuit of the motor after rotation of the shaft 58 in the uncaging direction to a predetermined extent. In practice it has been found that notwithstanding the opening of the motor circuit the momentum of the parts causes them to move to an undesirable extent after the motor circuit has been opened. This coasting or overrunning is not uniform and varies widely under different conditions of use. It is particularly affected by variations in temperature which change the operating characteristics of the lubricant in the motor and other bearings. It is highly desirable to bring the parts to rest immediately, or after a very short fixed interval, notwithstanding variations in the tendency to overrun. Overrunning in the caging direction may cause winding of the spring 60 to a point such that the spring is permanently distorted and overrunning in the uncaging direction may cause the rings 34 and 36 of the gyroscope to turn sufficiently to bring the dogs 42 and 44 into engagement with each other at the opposite side of the gyroscope. To avoid such overrunning, the motor is preferably provided with a suitable retarding means tending to quickly stop rotation after the motor circuit has been opened.

While the invention is not necessarily so limited, the retarding means for the motor is preferably an electromechanical brake and this may conveniently act directly on the commutator 64. As shown, a brake shoe 140 of insulating material is provided which is carried by a shaft 142 extending through the end wall of the motor housing 52. A coil spring 144 within the housing of the motor 52 biases the shoe 140 to cause it to engage the commutator 64. Secured to the outer end of the motor housing 52 is a vertically adjustable bracket 146 held in place by screws 148, 148. The bracket 146 carries an electromagnet 150 having a horseshoe pole piece 151. The magnet 150 has a shunt connection with the motor brushes 74 and 76 through conductors 152 and 154. Secured to the shaft 142 outside of the motor housing 52 is an armature 156 which is adapted to be moved downward when the electromagnet 150 is energized. The bracket 146, the magnet 150 and the armature 156 are enclosed by the end cap 56 which is held in place by screws 158, 158 threaded into the ends of the screws 148, 148.

It will be seen that by reason of the described shunt connection the magnet 150 is energized whenever the motor circuit is closed. When energized the magnet moves the armature 156 downward in opposition to the spring 144 thus holding the brake shoe 140 out of engagement with the commutator 64. Whenever the motor circuit is opened the magnet 150 is deenergized, thus releasing the armature 156 and enabling the spring 144 to press the shoe 140 against the commutator 64. This engagement of the shoe with the commutator serves to effectively brake the motor and quickly stop the rotation thereof.

The brake shoe 140 is formed of a suitable material that will not cause undue wear of the commutator, and this may be a phenolic plastic material having a canvas base. The engagement of the shoe with the commutator has the additional advantage that it keeps the commutator clean and polished at all times.

In operation when the pilot desires to effect caging of the gyroscope he manipulates the switch 96 to engage the contact 98 thus establishing a circuit through the motor in the manner described, and the motor is rotated relatively slowly in the caging direction. Power is transmitted from the motor through the described power transmitting mechanism to the caging shaft 40 of the gyroscope. After the dogs 42 and 44 have been brought into engagement with the stud 46 rotation of the motor continues for a brief interval to wind the spring 40 and thus build up a force which resists any uncaging tendency of the gyroscope. After the spring 60 has been sufficiently wound the circuit is opened at the limit switch 106 by means of the pin 138. The opening of the circuit deenergizes the electromagnet 150 and the brake shoe 140 thereupon engages the commutator 64 to quickly stop the motor rotation.

When the pilot desires to effect uncaging of the gyroscope he manipulates the switch 96 to engage the contact 100 thus establishing a circuit through the motor in the manner described and releasing the brake and the motor is rotated relatively rapidly in the uncaging direction. Power is transmitted from the motor through the described power transmitting mechanism to the caging shaft 40 of the gyroscope. After the dogs 42 and 44 have been sufficiently separated from the stud 46 the circuit is opened at the limit switch 106 by means of the pin 138. The opening of the circuit deenergizes the electromagnet 150 and the brake shoe 140 thereupon engages the commutator 64 to quickly stop the motor rotation.

What I claim is:

1. In a caging and uncaging device for use with a gyroscope having a caging shaft rotatable in opposite directions to effect caging and uncaging, the combination of an electric motor, a power transmitting mechanism connected with the motor and including an operating shaft rotatable in opposite directions and adapted to be positioned in normal alignment with the caging shaft of the gyroscope, a resilient mechanical connection adapted to engage the said operating shaft and the said caging shaft for transmitting power from the former to the latter, and means including circuit connections for the motor enabling the said power transmitting mechanism and the said resilient mechanical connection to rotate the caging shaft in one direction to effect caging and in the opposite direction to effect uncaging.

2. In a caging and uncaging device for use with a gyroscope having a caging shaft rotatable in opposite directions to effect caging and uncaging, the combination of an electric motor, a power transmitting mechanism connected with the motor and including an operating shaft rotatable in opposite directions and adapted to be positioned in normal alignment with the caging shaft, a coil spring adapted to be positioned coaxially with the said operating shaft and the said caging shaft and adapted to be mechanically connected with the said shafts for transmitting power from the former to the latter, and means including circuit connections for the motor enabling the said power transmitting mechanism and the said coil spring to rotate the caging shaft in one direction to effect caging and in the opposite direction to effect uncaging.

3. The combination of a gyroscope having a caging shaft rotatable in opposite directions to effect caging and uncaging, a support, means for resiliently mounting the gyroscope on the support so that the gyroscope is relatively movable to minimize the transmission of shock thereto, an electric motor mounted in a fixed position on the support, a power transmitting mechanism connected with the motor and including an oppositely rotatable operating shaft normally in alignment with the caging shaft and fixed against bodily movement relative to the support, a resilient mechanical connection between the said operating shaft and the said caging shaft for transmitting power from the former to the latter but permitting the gyroscope to move relatively as aforesaid, and means including circuit connections for the motor enabling the said power transmitting mechanism and the said resilient mechanical connection to rotate the caging shaft in one direction to effect caging and in the opposite direction to effect uncaging.

4. In a caging and uncaging device for use with a gyroscope having rotatable annular rings with dogs thereon and having a rotatable caging shaft with a pinion thereon meshing with teeth on the rings for rotating the said rings in opposite directions to enable the dogs to engage and release a movable pin and thereby effect caging and uncaging, the combination of an electric motor rotatable in opposite directions, a power transmitting mechanism connected with the motor and including an operating shaft adapted to be connected with the caging shaft for transmitting power from the motor to the caging shaft, circuit connections for the motor including a switch whereby the motor can be connected for rotation in one direction to effect caging and in the opposite direction to effect uncaging, a limit switch in the motor circuit connections, and means for automatically operating the limit switch to open the circuit of the motor after rotation of the operating shaft to a predetermined extent in the caging direction so as to rotate the caging shaft to effect engagement of the gyroscope dogs with the pin and thereby complete the caging and for automatically operating the limit switch to open the circuit of the motor after rotation of the operating shaft in the uncaging direction to such a predetermined extent that rotation of the caging shaft in the uncaging direction is stopped before the dogs are brought into engagement with each other.

5. In a caging and uncaging device for use with a gyroscope having a caging shaft rotatable in opposite directions to effect caging and uncaging, the combination of an electric motor rotatable in opposite directions, a self-locking power transmitting mechanism connected with the motor and including an operating shaft adapted to be positioned in normal alignment with the caging shaft, a resilient mechanical connection adapted to engage the said operating shaft and the said caging shaft for transmitting power from the former to the latter, circuit connections for the motor including a switch whereby the motor can be connected for rotation in one direction to effect caging and in the opposite direction to effect uncaging, a limit switch in the motor circuit connections, and means for automatically operating the limit switch to open the circuit of the motor after the operating shaft has been rotated to a predetermined extent in the caging direction so as to cause completion of caging and so as to cause loading of the resilient mechanical connection to a predetermined extent which connection serves in conjunction with the self-locking power transmitting means to firmly hold the operating shaft in the position corresponding to the caged positions of the gyroscope parts.

6. In a caging and uncaging device for use with a gyroscope having a caging shaft rotatable in opposite directions to effect caging and uncaging, the combination of an electric motor rotatable in opposite directions, a self-locking power transmitting mechanism connected with the motor and including an operating shaft adapted to be positioned in normal alignment with the caging shaft, a coil spring adapted to be positioned coaxially with the power shaft and the gyroscope shaft and adapted to be mechanically connected with the said shafts for transmitting power from the former to the latter, circuit connections for the motor including a switch whereby the motor can be connected for rotation in one direction to effect caging and in the opposite direction to effect uncaging, a limit switch in the motor circuit connections, and means for automatically operating the limit switch to open the circuit of the motor after the operating shaft has been rotated to a predetermined extent in the caging direction so as to cause completion of caging and so as to cause winding of the coil spring to a predetermined extent which spring then serves in conjunction with the self-locking power transmitting means to firmly hold the operating shaft in the position corresponding to the caged positions of the gyroscope parts.

7. In a caging and uncaging device for use with a gyroscope having a caging shaft rotatable in opposite directions to effect caging and uncaging, the combination of an electric motor rotatable in opposite directions, an operating shaft adapted to be operatively connected with the caging shaft, a worm wheel on the said operating shaft, a worm meshing with the worm wheel and connected with the motor to be driven thereby, circuit connections for the motor including a switch whereby the motor can be connected for operation in one direction to effect caging and in the opposite direction to effect uncaging, a limit switch in the motor circuit connections having two pairs of normally engaging contacts, a limit switch shaft connected with the said operating shaft for rotation in opposite directions in timed relationship therewith, and an eccentric pin carried by the said limit switch shaft and serving upon rotation of the last said shaft in one direction to separate the limit switch contacts of one pair after rotation of the motor to a predetermined extent in the caging direction and serving upon rotation of the last said shaft in the opposite direction to separate the limit switch contacts of the other pair after rotation of the motor to a predetermined extent in the uncaging direction.

8. In a caging and uncaging device for use with a gyroscope having a caging shaft rotatable in opposite directions to effect caging and uncaging, the combination of an electric motor rotatable in one direction at a relatively low speed and rotatable in the opposite direction at a relatively high speed, a self-locking power transmitting mechanism connected with the motor and including an operating shaft adapted to be positioned in normal alignment with the caging shaft, a resilient mechanical connection adapted to engage the said operating shaft and the said caging shaft for transmitting power from the former to the latter, the said connection being adapted to serve in conjunction with the self-locking power transmitting means to firmly hold the gyroscope parts in their caged positions, circuit connections for the motor including a switch whereby the motor can be connected for rotation in the first said direction at a relatively low speed to effect caging and in the second said direction at a relatively high speed to effect uncaging, a limit switch in the motor circuit connections, and means for automatically operating the limit switch to open the circuit of the motor after the operating shaft has been rotated to a predetermined extent in the caging direction so as to cause completion of caging and so as to cause loading of the resilient mechanical connection to a predetermined extent and for automatically operating the limit switch to open the circuit of the motor after rotation of the operating shaft to a predetermined extent in the uncaging direction.

9. In a caging and uncaging device for use with a gyroscope having a caging shaft rotatable in opposite directions to effect caging and uncaging, the combination of an electric motor rotatable in opposite directions, a self-locking power transmitting mechanism connected with the motor and including an operating shaft adapted to be positioned in normal alignment with the caging shaft, a resilient mechanical connection adapted to engage the said operating shaft and the said caging shaft for transmitting power from the former to the latter, circuit connections for the motor including a switch whereby the motor can be connected for rotation in one direction to effect caging and in the opposite direction to effect uncaging, a limit switch in the motor circuit connections, means for automatically operating the limit switch to open the circuit of the motor after the operating shaft has been rotated to a predetermined extent in the caging direction so as to cause completion of caging and so as to cause loading of the resilient mechanical connection to a predetermined extent which connection serves in conjunction with the self-locking power transmitting means to firmly hold the gyroscope parts in their caged positions, a brake for the motor, and means for automatically applying the brake shoe simultaneously with each operation of the limit switch to open the motor circuit.

10. In a caging and uncaging device for use with a gyroscope having a caging shaft rotatable in opposite directions to effect caging and uncaging, the combination of an electric motor rotatable in one direction at a relatively low speed and rotatable in the opposite direction at a relatively high speed, a self-locking power transmitting mechanism connected with the motor and including an operating shaft adapted to be positioned in normal alignment with the caging shaft, a resilient mechanical connection adapted to engage the said operating shaft and the said caging shaft for transmitting power from the former to the latter, the said connection being adapted to serve in conjunction with the self-locking power transmitting means to firmly hold the gyroscope parts in their caged positions, circuit connections for the motor including a switch whereby the motor can be connected for rotation in the first said direction at a relatively low speed to effect caging and in the second said direction at a relatively high speed to effect uncaging, a limit switch in the motor circuit connections, means for automatically operating the limit switch to open the circuit of the motor after the operating shaft has been rotated to a predetermined extent in the caging direction so as to cause completion of caging and so as to cause loading of the resilient mechanical connection to a predetermined extent and for automatically operating the limit switch to open the circuit of the motor after rotation of the operating shaft to a predetermined extent in the uncaging direction, a brake for the motor, and means for automatically applying the brake simultaneously with each operation of the limit switch to open the circuit of the motor.

EVERT BLOMGREN.

REFERENCES CITED

The following references are of record in the file of this patent:

UNITED STATES PATENTS

| Number | Name | Date |
| --- | --- | --- |
| 1,451,928 | Tanner | Apr. 17, 1923 |
| 1,556,620 | Lindquist | Oct. 13, 1925 |
| 1,911,021 | Gunther | May 23, 1933 |
| 1,996,896 | Bennett | Apr. 9, 1935 |
| 2,348,603 | Carlson | May 9, 1944 |
| 2,387,713 | Bradford | Oct. 30, 1945 |
| 2,393,124 | Smith | Jan. 15, 1946 |
| 2,451,109 | Nardone | Oct. 12, 1948 |